Jan. 21, 1969     E. C. ELSNER     3,423,111
PLAIN END PIPE JOINT
Filed May 10, 1967
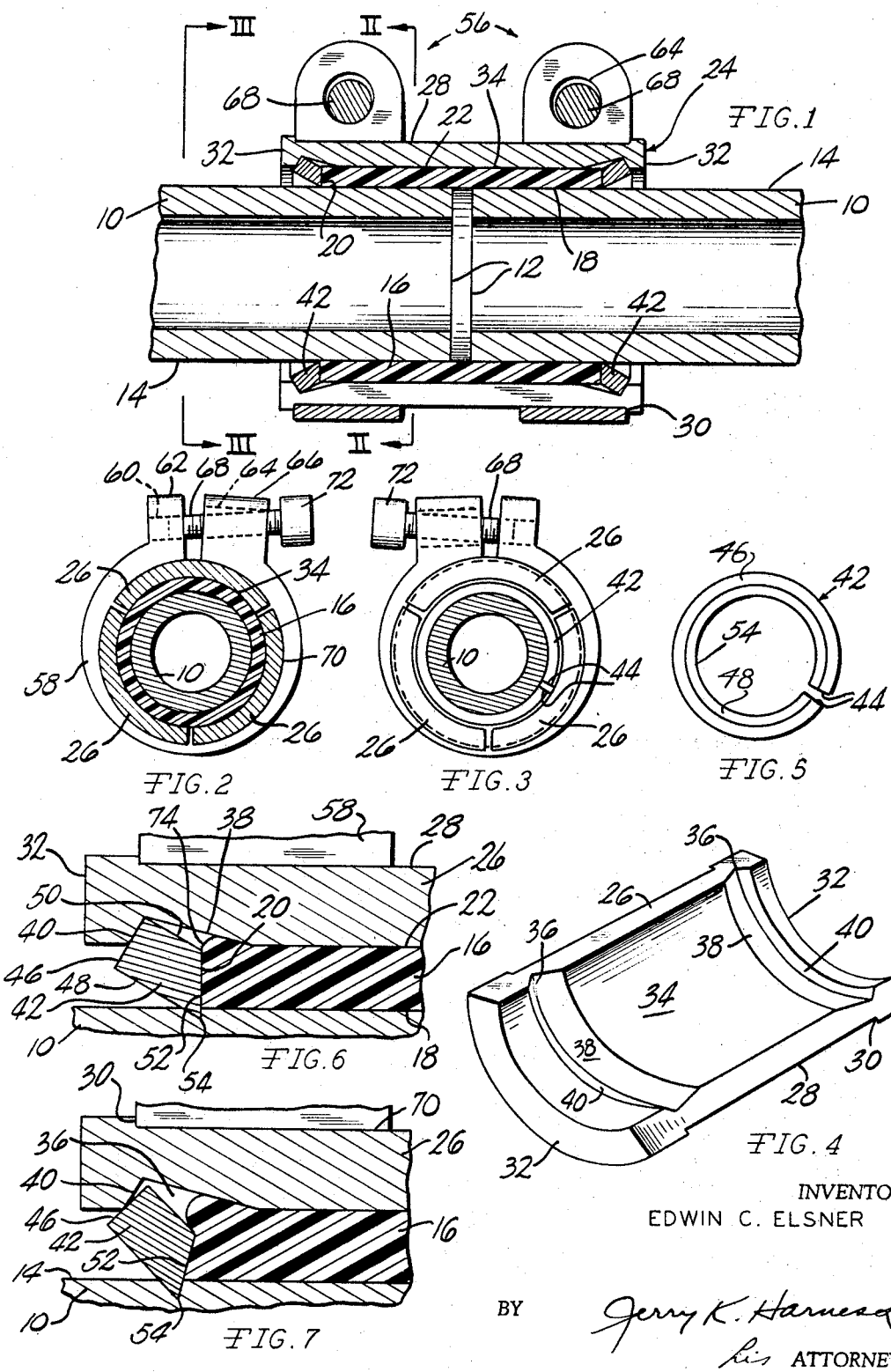
INVENTOR
EDWIN C. ELSNER
BY    *Jerry K. Harness*
*his* ATTORNEY

United States Patent Office 3,423,111
Patented Jan. 21, 1969

3,423,111
PLAIN END PIPE JOINT
Edwin C. Elsner, Tujunga, Calif., assignor to Aeroquip Corporation, Jackson, Mich.
Filed May 10, 1967, Ser. No. 637,579
U.S. Cl. 285—340    5 Claims
Int. Cl. F16l 21/04

ABSTRACT OF THE DISCLOSURE

A joint or coupling for conduit or pipe particularly suitable for coupling plain end conduits in end-to-end relationship utilizing a tubular resilient gasket encompassed within a radially contractible sleeve. Radially contractible metal rings are located within the sleeve including a sharpened edge which embeds into the conduits simultaneously with radial contraction of the sleeve to compress the gasket into sealing relationship with the conduit's exterior surface, the rings confining the gasket against longitudinal extrusion and preventing relative axial displacement between the conduits and the sleeve.

Background of the invention

The invention pertains to the field of conduit or pipe joints and couplings wherein resilient gasket means are used to establish a sealing relationship between conduits disposed in end-to-end orientation and the coupling is firmly maintained on the conduits by a metal-to-metal contact which augments the gasket sealing.

While prior art devices used to interconnect couplings in end-to-end relationship have utilized tubular gaskets encompassed within radially contractible sleeves, prior art devices have not been of such a nature as to readily adapt themselves for use with conventional pipe, nor are of such manufacture as to be economically producible for widespread usage. Additionally, prior art couplings of the type of the invention have not utilized metal-to-metal engagement between the coupling and conduits, as produced by contractible rings which produce suitable resistance to "blow-off" pressures, and simultaneously cooperate with the gasket to increase the effectiveness of the gasket sealing characteristics.

Summary of the invention

The basic purpose of the invention is to provide a conduit or pipe coupling which is suitable for use with conventional galvanized or black pipe, such as used in water plumbing systems, wherein the coupling requires no threading or machining of the conduit, yet produces an effective sealing relationship with the conduit, and simultaneously furnishes a metal-to-metal engagement between the conduit and coupling to provide desirable mechanical characteristics.

Presently, when it is desired to interconnect conventional pipe in end-to-end relationship the pipe must be threaded at its ends whereby an internally threaded coupling or union is used to establish the connection. The average home owner does not have available the equipment necessary for threading pipe, and therefore, must often hire the services of a plumber to establish this type of conduit connection. Additionally, threaded pipe connections do not permit axial misalignment between the interconnected conduits, and thus, very accurate fitting and measusement of the conduits is required when using threaded connections. The coupling of the invention permits pipe or conduit to be firmly interconnected in end-to-end relationship without requiring the presence of threads, or other machining or preparation of the conduits. The disclosed coupling can be used in permanent plumbing applications, and also finds use as a means for repairing conduit wherein the damaged portion of the conduit can be removed and a new section inserted by use of the coupling of the invention. In some instances the disclosed coupling can be used in place of a threaded union and the applications of use of the invention will be apparent to those skilled in the art.

Basically, the coupling consists of a tubular resilient gasket which is slipped over the ends of the conduits to be interconnected to bridge the conduit ends. A radially contractible sleeve encompasses the gasket and contractible means are associated with the sleeve to contract the gasket upon the conduits to establish an effective sealing relationship therewith. Located within the sleeve adjacent each end thereof is a radially contractible metal ring having a sharpened edge which will embed into the conduit. The contractible rings are disposed adjacent the ends of the gasket and confine the gasket against longitudinal extrusion. Additionally, the rings are associated with a shoulder surface defined within the sleeve inner surface and are so constructed that any tendency for the coupling to move in a "blow-off" direction relative to the conduits tends to distort a ring to cause the ring to embed further into the conduit and effectively resist such axial displacement. Radial contraction of the gasket and rings is simultaneously accomplished and the coupling simultaneously produces effective sealing by means of the resilient gasket and metal-to-metal contact produced by the rings.

The construction of the coupling, and association with the conduits being interconnected, is such that effective sealing can be accomplished even though limited misalignment between the conduits exists, and this characteristic of the coupling is of particular advantage when installing the coupling in existing plumbing systems.

Brief description of the drawing

The advantages and novel aspects of the invention will be apparent from the following description and accompanying drawings wherein:

FIG. 1 is a diametrical, sectional view of a joint or coupling in accord with the invention as mounted upon a pair of plain end conduits in end-to-end relationship, the position of the components being that prior to tightening of the clamps and radial contraction of the sleeve, FIG. 2 is an elevational, sectional view along section II—II of FIG. 1, FIG. 3 is an elevational sectional end view along section III—III of FIG. 1, FIG. 4 is an enlarged perspective view of one of the segments constituting the radially contractible sleeve, FIG. 5 is an elevational view of a contractible ring in accord with the invention, FIG. 6 is an enlarged, detail, elevational, sectional view of a ring, conduit and the gasket under normal operating conditions after the sleeve has been contracted, and FIG. 7 is an enlarged, detail, sectional, view similar to FIG. 6 illustrating, in an exaggerated manner, distortion of the ring as occurs to resist longitudinal displacement of the conduit and coupling which increases the embedment of the ring into the conduit.

Description of the preferred embodiment

With reference to FIGS. 1 through 3 the relationship of the assembled components of a joint or coupling in accord with the invention will be appreciated. The conduits which are to be interconnected in end-to-end relationship are indicated at 10, and these conduits may be conventional galvanized or black pipe having ends 12 and a cylindrical outer surface 14. It will be noted that no threading, or other machining, occurs on the conduits' outer surface 14, and they may be considered to have "plain ends."

A cylindrical, tubular gasket 16 is disposed over the conduits 10, and is of sufficient axial length to bridge the conduits and be disposed over an axial portion of each of the exterior surfaces of the conduits. The gasket 16 is formed of a resilient material, such as vinyl, rubber, or the like and includes an inner cylindrical diameter 18 substantially equal to the diameter of the conduit surfaces 14 with which the gasket is to be used. Due to the resilient nature of the gasket it would be possible that the gasket inner diameter could be slightly smaller or larger than the conduit's exterior surface, and still provide adequate sealing characteristics. As the gasket must be axially slipped over the conduit's exterior surface, it is preferable that the gasket inner diameter be equal to or slightly larger than the conduit exterior surface diameter.

The longitudinal length of the gasket 16 is defined by ends 20, which are perpendicularly disposed to the longitudinal axis of the gasket and the gasket also includes a cylindrical outer surface 22.

The gasket 16 is encased within a radially contractible sleeve generally indicated at 24, which consists of three similar segments 26 in the disclosed embodiment, the configuration of which is best appreciated in FIGS. 2, 3 and 4. Each of the segments 26 forms approximately 120° of the circumference of the sleeve 24. The outer surface of the segments is recessed at 28 forming a shoulder 30 adjacent each end 32 of the segments, wherein the shoulders serve to position and maintain the constricting clamps upon the segments, as later described. Internally, the segments 26 are each provided with an inner surface 34 of a cylindrical configuration which corresponds to the diameter of the gasket outer surface 22.

Adjacent the end 32 of each segment, and thus adjacent the ends of the assembled sleeve, the segment inner surfaces are formed with a recess 36 having a cross sectional configuration which will be readily apparent from FIGS. 6 and 7. The recess 36 includes a surface 38 which is disposed, in the preferred embodiment, substantially 15° below the horizontal, FIG. 6. The surface 38 intersects a shoulder surface 40 which is disposed substantially 30° from the vertical and thus is obliquely related to the axis of the gasket when the coupling is assembled.

A radially contractible metal ring 42 is disposed within the assembled sleeve 24 adjacent each end thereof. The rings 42 are of a split configuration, FIG. 5, forming ends 44, and are preferably formed of a metal material which is harder than the material of the conduits with which the coupling will be utilized.

The cross sectional configuration of the rings 42 will be apparent from FIGS. 6 and 7 and includes an outer peripheral surface 46 which is disposed in an oblique manner to the axis of the associated ring substantially 30° from the vertical. The ring surface 46 is intersected by substantially parallel inner and outer surfaces 48 and 50, respectively, which define the elongated configuration of the sealing ring in the axial direction, and an end surface 52 is formed on the rings which is substantially perpendicular to the ring axis and of a radial dimension substantially equal to the gasket wall thickness. The intersection of the surfaces 48 and 52 form a sharp inner edge 54 which is adapted to embed into a conduit 10, as will be later described. Preferably, the normal diameter of said edge 54 is substantially equal to the normal inner diameter 18 of the gasket 16.

Radial contraction of the coupling components is accomplished by identical clamps 56 which are mounted upon the sleeve 24 as defined by segments 26. The clamps 56 each include a circumferential extending portion 58 terminating in an enlarged boss at each end. A threaded bore 60 is defined in the boss 62, and an enlarged opening 64 is defined in the boss 66. The opening 64 is of a larger diameter than a screw 68 whereby the screw 68 may pass through the opening for threaded engagement with the bore 60 prior to the clamps inner diameter 70 forming a substantially perfect cylinder. The head 72 formed on the screw will bear against the boss 66 and in this manner tightening of the screw 68 will "close" the associated clamp 56 as will be readily appreciated by one skilled in the art.

The operation of a conduit coupling in accord with the invention is described below:

The conduits 10 to be interconnected in end-to-end relationship may be free and unsupported, or it is possible that the conduits may already be incorporated into a plumbing system.

The clamps 56 will first be placed upon the conduits prior to installation of the gasket. Of course, the clamps 56 will be opened as far as possible, and the clamps may be located upon the same conduit, or one clamp positioned over each conduit. Next the rings 42 are axially slipped over the conduits 10, one ring being associated with each conduit. The rings are positioned upon their associated conduit such that the inner edge 54 is disposed toward the associated conduit end 12, and the ring peripheral surface portion 46 will be disposed remote from the conduit end.

Assuming the conduits 10 to be freely movable, the gasket 16 will now be slipped upon one of the conduits until substantially half of the axial length of the gasket is located thereon. Thereupon the other conduit will be coaxially aligned with the gasket and inserted into the other end of the gasket. Should the conduits with which the coupling is to be employed already be a part of an existing plumbing system, and the coupling is being used for repair purposes to connect conduits having ends 12 closely disposed, for instance, the conduits 10 would be temporarily laterally displaced, if necessary, to permit the clamps, rings and gasket to be slipped over the conduit ends and the gasket would be slipped over one end of one of the conduits wherein the entire gasket is substantially mounted upon a single conduit. Thereupon, the conduits are brought into coaxial alignment and the gasket is positioned to bridge the conduit ends in the relationship shown in FIG. 1.

After the rings, clamps and gasket are positioned as described above, the rings 42 are axially translated upon their respective conduits such that the ring surfaces 52 will engage the adjacent gasket ends 20. Thereupon, the three sleeve segments 26 are circumferentially placed about the gasket 16 and rings such that the sleeve shoulder surface 40 will engage the ring peripheral surface portion 46 in recesses 36. After the segments 26 have been placed upon the gasket the clamps 56 are axially moved upon the conduits over the ends of the segments 26 wherein the clamps may be received upon the segment surface recess 28. The clamps 56 open to a sufficient extent to permit this type of installation and the clamps are preferably located against the shoulders 30 as is apparent in FIG. 1.

The screws 68 of the clamps are now rotated by suitable tool means to circumferentially contract the clamps and radially contract the sleeve 24, which will compress and contract the gasket 16 upon the conduits 10, and simultaneously radially contract the rings 42 into engagement with the conduits. The gasket, rings, sleeve segments and clamps are so formed that when the clamps 56 are tightened to the normal operative condition, the inner and outer diameters of the gasket 16, rings 42, sleeve 24, and the inner diameter 70 of the clamp band portion 58 define concentric circles to insure that equal radial forces are imposed upon the coupling components. The circumferential width of the segments 26, and the circumferential length of the rings 42 is such that only a small gap exists between the segments, and the ends 42 of the sealing rings when the coupling is fully assembled to the operative condition.

As the sleeve 24 is radially contracted, the gasket 16 will be compressed into an effective sealing relationship with the outer surface 14 of the conduits 10. Additionally, the radial contraction of the sleeve 24 will cause the ring's sharp inner edges 54 to embed into the material of the conduits as illustrated in FIG. 6. The surface 52 of the rings will confine the gasket against axial extrusion and the gasket ends will bulge at 74 into the recess 36 due to the tendency for the gasket to extrude.

The coupling provides several sealing conditions in order to assure that no leakage occurs. Primarily, sealing is accomplished by engagement of the inner diameter 18 of the gasket with the exterior surface 14 of the conduits 10. Additionallly, the metal-to-metal contact and embedding of the sharp inner edge 54 of the rings 42 will seal the rings with respect to the conduits, except at the ends 44 of the rings. The engagement of the ring's surfaces 52 with the ends 20 of the gasket also form a sealed relationship, and under test conditions the coupling has successfully produced a leak proof connection in systems operating under fluid pressures as high as 3000 lbs. per square inch.

The configuration of the rings 42, and the ring's association with the sleeve shoulder 40 is such that initial relative axial displacement between a conduit and the coupling in a "blow-off" direction will cause a ring to effectively resist such movement and, in fact, increase the degree of engagement between a ring and the associated conduit. The rings 42 are of a somewhat conical configuration as defined by the edges 48 and 50. Extreme forces in the axial "blow-off" direction imposed upon a ring will tend to increase the included angle defined by the conical configuration of the ring, which moves the inner edge 54 radially inward. Such distortion can occur upon sufficient axial forces being imposed upon the ring by the associated conduit attempting to be axially displaced relative to the sleeve. The nature of the engagement between the sleeve shoulder surface 40 and the ring surface 46 is such that the ring surface 46 is engaged by the sleve at a point radially displaced outwardly with respect to the inner edge 54. Also, the sleeve engages the ring adjacent its outermost portions. As the shoulder surface 40 is obliquely related to the axis of the gasket, and faces the gasket, a very effective resistance to axial displacement of the conduit in a "blow-off" direction is provided by the sleeve shoulder surface 40 and upon initial axial displacement occurring, one of the rings will be distorted in a manner which is shown in an exaggerated form in FIG. 7. Upon sufficient axial forces occurring between the conduit and sleeve the configuration of a ring will be distorted wherein the inner edge 54 is radially displaced inwardly with respect to the ring surface 46 causing the sharpened edge 54 to penetrate and embed deeper into the associated conduit 10. In effect, the ring "pivots" about a point of engagement between surfaces 40 and 46. This condition will exist throughout the configuration of the distorted ring and effectively resist further relative axial movement between the conduit and the coupling. Of course, such distortion of the rings need only be very slight in order to effectively accomplish the above described operation.

Should the coupling be required to be removed from the conduits such disassembly is easily accomplished by reversing the steps of the assembly recited above. Should it be desired to remove the coupling and reinstall the coupling on the same conduits, it is preferred that the gasket and sleeve be axially shifted slightly during the second assembling procedure such that the rings will not embed into the previously formed grooves in the conduits resulting from the embedded relationship. The most effective sealing connection can be accomplished when an original embedded relationship between the rings 42 and conduits 10 occurs.

From the above description it will be appreciated that the coupling of the invention may be easily used by non-skilled operators with pipes and conduits which are not threaded or otherwise previously machined to receive a coupling connection. The coupling may be used in original installations, or may be installed into existing plumbing systems, such as for repair purposes when it is desired to insert a new section of conduit for a damaged or faulty section. The components of the coupling may be economically produced, such as by stamping operations and the operation and assembly of the coupling is of a relatively simplified nature to permit use by the unskilled.

The arrangement of the components is such that the coupling will maintain the conduits 10 in coaxially relationship. However, due to the use of the resilient gasket, and the type of metal-to-metal contact produced by the rings 42 an effective sealing connection can be made even though limited misalignment exists between the conduits being connected. Tests have indicated that efficient leak-proof sealing connections can be provided even though up to 10° of misalignment between the conduits may occur. This feature of the invention provides advantages over threaded type connections, which require a substantially perfect alignment between conduits.

Various modifications to the disclosed embodiment may be apparent to one skilled in the art without departing from the spirit and scope thereof, and it is intended that the invention be defined only by the following claims:

I claim:

1. A conduit coupling adapted to interconnect conduits in end-to-end relationship comprising, in combination, a tubular annular gasket of resilient material and uniform thickness having an inner diameter substantially corresponding to the exterior diameter of the conduits to be coupled and including ends defining the gasket longitudinal length, said gasket being adapted to bridge the ends of the conduits to be coupled, a radially contractible sleeve exteriorly encompassing said gasket having an inner surface and including ends defining the sleeve's longitudinal length, the longitudinal length of said sleeve being greater than that of said gasket wherein each end of said sleeve axially extends beyond an end of said gasket, an annular ring abutment surface defined in said sleeve adjacent each end thereof and intersecting said inner surface, a radially contractible, axially distortible ring of a material harder than the material of the conduits to be interconnected located within said sleeve adjacent each end thereof and substantially concentric to said gasket, said rings each including an outer peripheral portion engaging a ring abutment surface and a sharp inner edge having a normal diameter substantially equal to the gasket inner diameter, each said ring abutment surface and the associated ring peripheral portion being radially spaced from the associated ring inner edge and longitudinally spaced from the associated ring inner edge in the direction of the adjacent sleeve end, said gasket being located intermediate said rings and said gasket ends engaging said rings, and sleeve contracting means mounted upon said sleeve adapted to simultaneously radially contract and sealingly compress said gasket upon the conduits to be coupled and radially contract said rings to embed said sharp inner edges thereof into the conduits being coupled, said rings upon contraction of said sleeve preventing axial extrusion of said gasket.

2. In a conduit coupling as in claim 1 wherein said rings each include a sleeve abutment engaging portion radially spaced outwardly with respect to the inner edge of the associated ring, said rings' sleeve engaging portions being disposed further from said gasket than said inner edge of the associated ring in the axial direction of said gasket, and said rings' sleeve engaging portions being so related to the associated abutment surface that relative axial displacement of a conduit tending to withdraw the conduit from said gasket causes the ring inner edge embedded into the conduit to pivot about a location of engagement between the ring's sleeve engaging portion and engaged abutment surface to radially displace the ring inner edge inwardly and increase the extent of ring embedment with the associated conduit.

3. In a conduit coupling as in claim 2 wherein said abutment surface comprises an annular shoulder surface defined on said sleeve inner surface adjacent each end of said sleeve, said annular surfaces being obliquely related to the longitudinal axis of said gasket and facing toward the adjacent end of the said gasket.

4. In a conduit coupling as in claim 3 wherein said rings each include first and second substantially flat surfaces, said first ring surface being substantially perpendicular to the axis of the associated ring and said second surface constituting said rings' sleeve abutment engaging portion and being obliquely related to said first surface and substantially parallel to the annular shoulder surface engaged by the associated ring.

5. In a conduit coupling as in claim 4 wherein said rings' first surface radial dimension is substantially equal to the normal radial wall thickness of said gasket, said gasket ends being substantially perpendicular to the gasket axis and substantially parallel to the adjacent ring's first surface and engaging said first surface.

References Cited

UNITED STATES PATENTS

| 597,733 | 1/1898 | Myers | 285—340 |
| 2,225,208 | 12/1940 | Crickmer | 285—340 X |
| 2,459,251 | 1/1949 | Stillwagon | 285—340 X |
| 2,491,004 | 12/1949 | Graham | 285—112 |

FOREIGN PATENTS

| 1,001,248 | 8/1965 | Great Britain. |

THOMAS F. CALLAGHAN, *Primary Examiner.*

U.S. Cl. X.R.

285—373